United States Patent [19]

Seymour

[11] 3,717,449
[45] Feb. 20, 1973

[54] TREATING GLASS SHEETS DURING SHAPING AND COOLING

[75] Inventor: Samuel L. Seymour, Oakmont, Pa.
[73] Assignee: PPG Industries, Inc., Pittsburgh, Pa.
[22] Filed: Oct. 1, 1970
[21] Appl. No.: 77,284

[52] U.S. Cl. ..................65/104, 65/106, 65/273, 65/287, 65/348
[51] Int. Cl. ............................................C03b 23/02
[58] Field of Search........65/104, 106, 273, 275, 287, 65/289, 348, 351

[56] References Cited

UNITED STATES PATENTS

| | | |
|---|---|---|
| 3,468,645 | 9/1969 | McMaster et al...................65/104 X |
| 3,223,504 | 12/1965 | Cypher et al............................65/106 |
| 3,510,286 | 5/1970 | Cypher..................................65/104 |

Primary Examiner—Arthur D. Kellogg
Attorney—Chisholm & Spencer

[57] ABSTRACT

Press bending heated glass sheets between a solid type-press bending mold and a frame-type press bending mold introduces a temperature gradient through the thickness of the glass. This gradient induces thermal warpage when the glass cools below its strain point. The present invention compensates for this warpage by cooling the surface engaged by the frame-type mold more rapidly than the surface engaged by the solid-type pressing mold and supporting the glass sheet with a shaping surface that engages at least a portion of the surface cooled more slowly during the cooling operation.

11 Claims, 7 Drawing Figures

INVENTOR
SAMUEL L. SEYMOUR

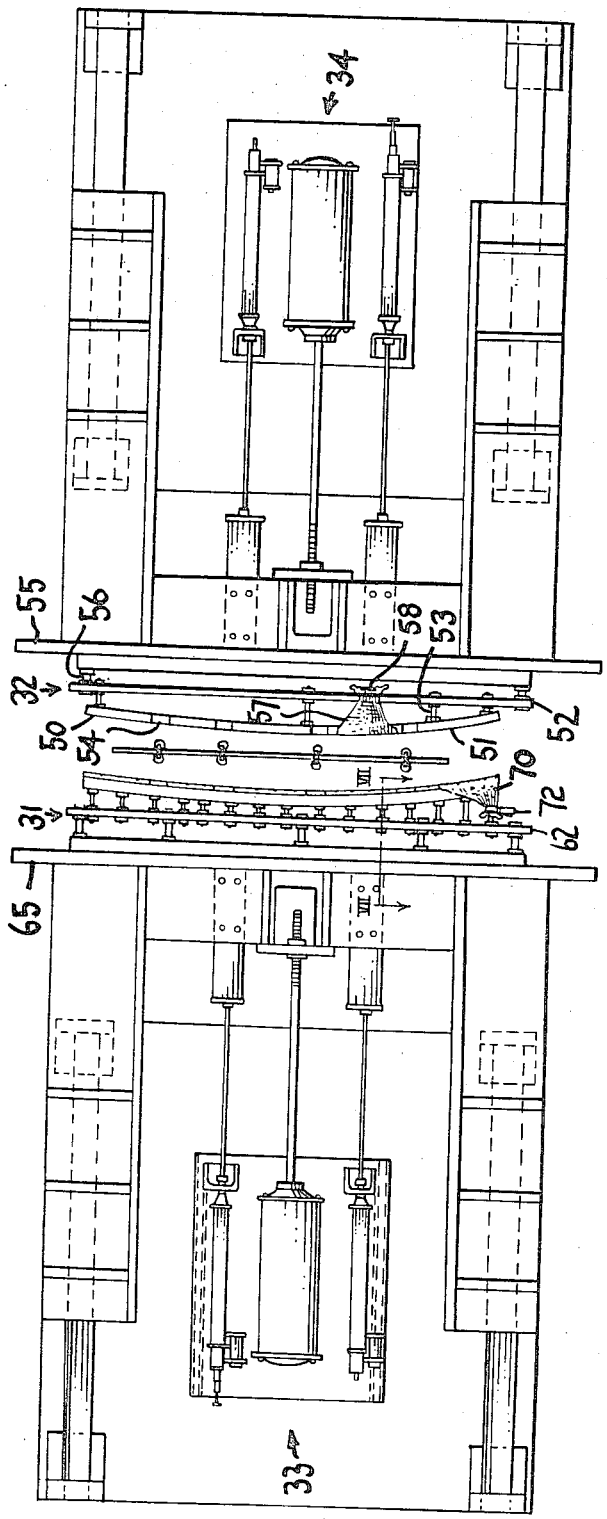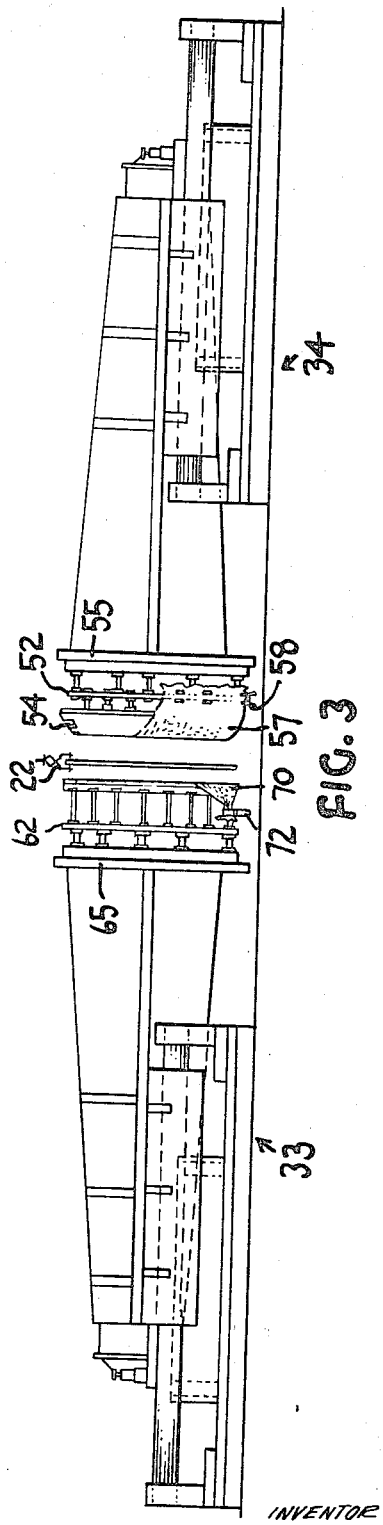

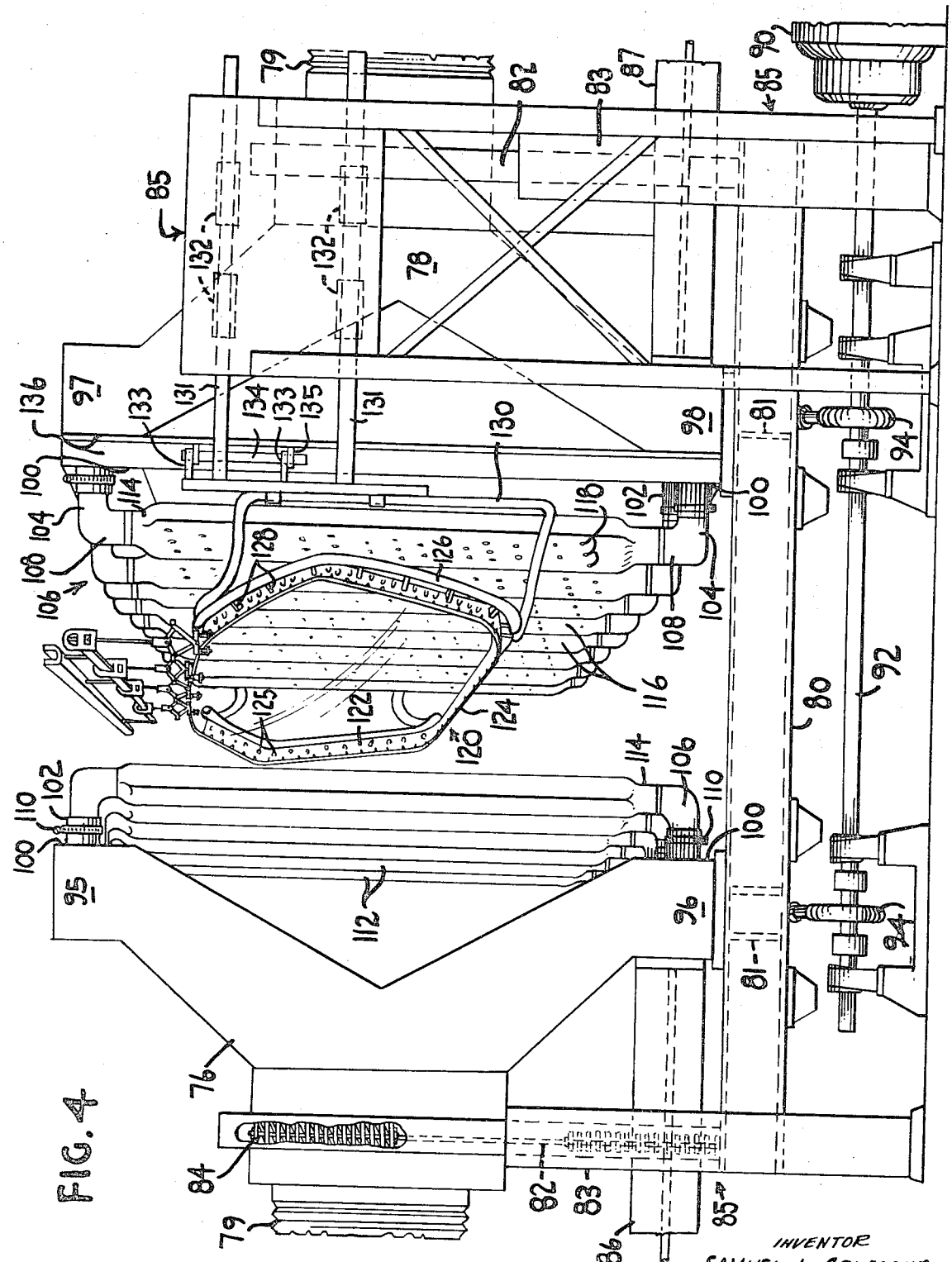

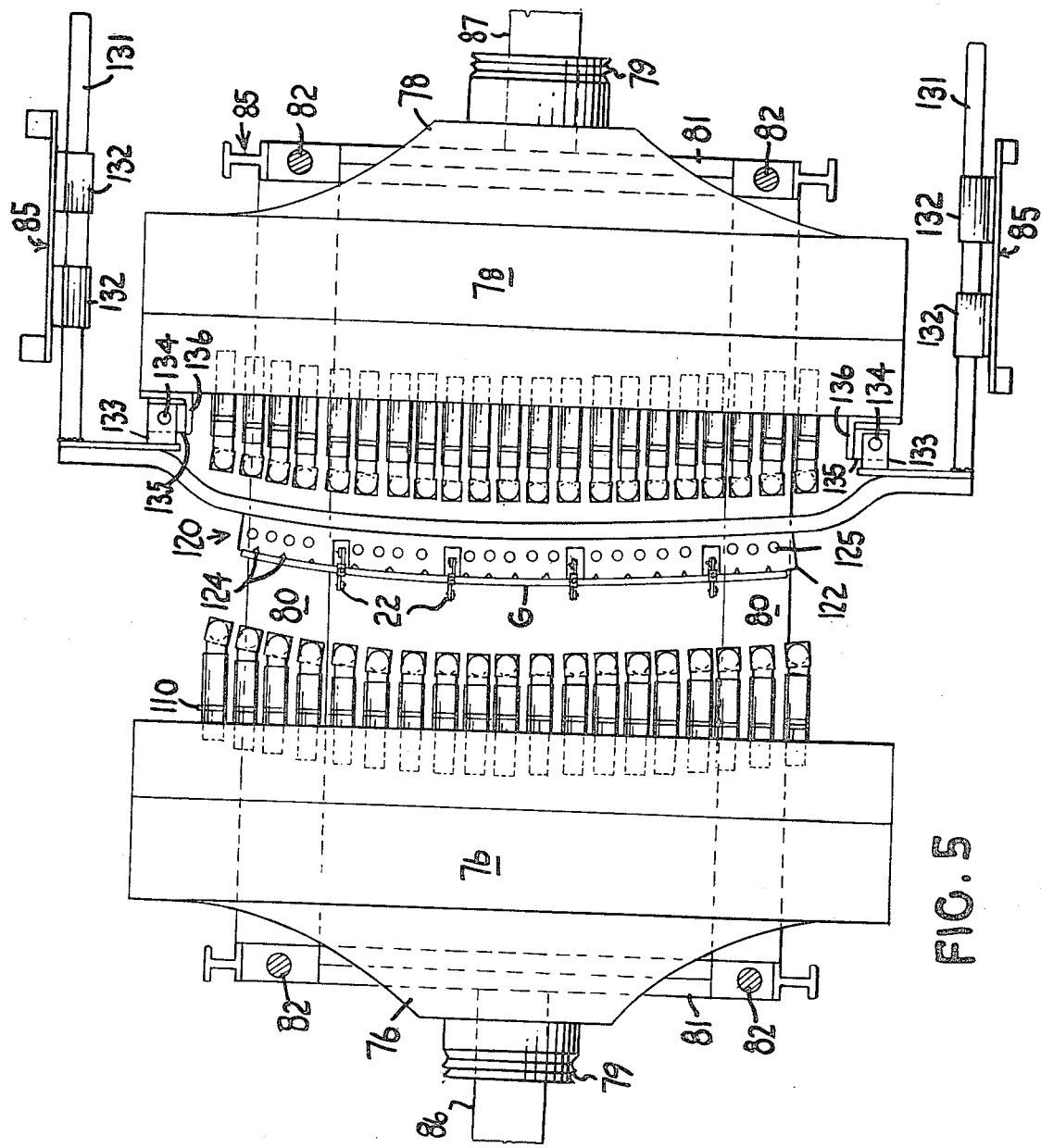

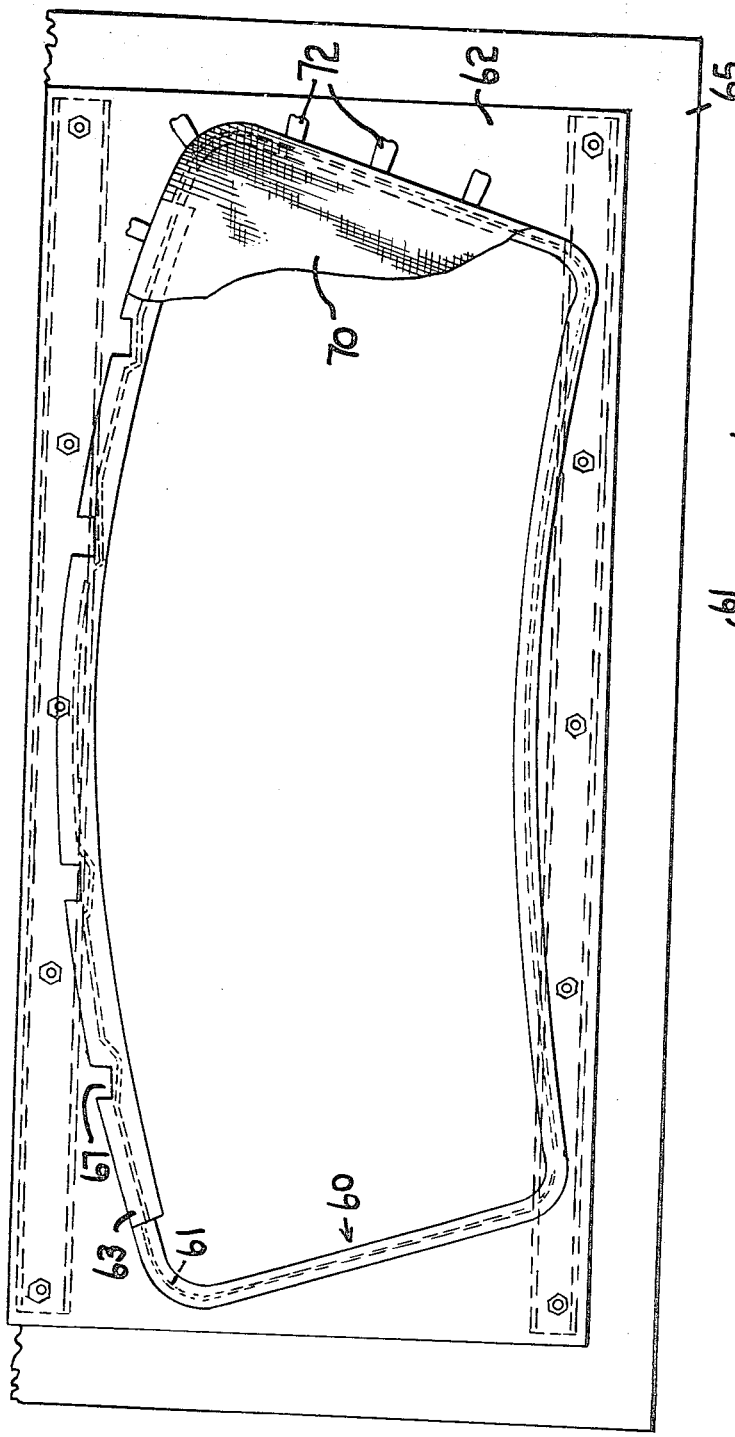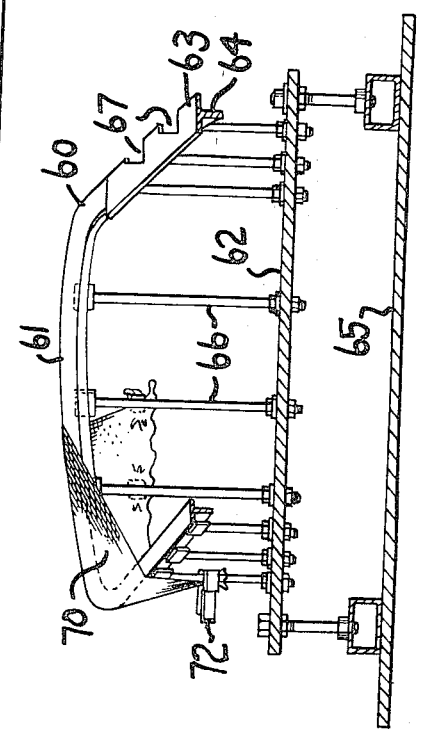

TREATING GLASS SHEETS DURING SHAPING AND COOLING

BACKGROUND OF THE INVENTION

In the fabrication of shaped glass products such as curved windows for vehicles such as automobiles, aircraft, speed boats and the like, cover plates for cathode ray tubes, bay windows and the like, glass sheets are shaped to their ultimate shape by press bending after they are heated to their deformation temperature by sandwiching the heat-softened glass sheets between a pair of press bending molds having complementary shaping surfaces conforming to the ultimate shape desired for the fabricated articles. An alternate well known methods for shaping glass sheets to make such products involves gravity bending.

In gravity bending, one or more glass sheets are supported above a surface conforming to the shape desired for the bent glass and the supported glass sags by gravity to conform to the shape of the surface. Since the hot glass tends to become marked when it contacts a shaping surface, gravity type molds are usually of the outline type that engage only the marginal portion of the bent glass. Gravity sag molds of the outline type are described and claimed in U.S. Pat. No. 3,248,196 to Harold E. McKelvey. These outline type molds fail to control sag in the unsupported mold portion enclosed within the portion supported by the outline mold.

In press bending, heat-softened glass sheets are sandwiched between press bending molds of complementary curvature. In press bending using so-called solid-type molds, the molds engage the opposite major surfaces of the glass throughout approximately their entire extent as in U.S. Pat. No. 3,367,764 to Samuel L. Seymour. Frame type pressing molds engage glass sheets in their marginal portions only as in U.S. Pat. 3,256,080 to Jean Vranken. A combination of a solid mold engaging one side over approximately its entire extent and a frame mold engaging the other side in its marginal portion only is shown in U.S. Pat. No. 3,123,459 to Carl Hens.

Each of these press bending operations has its drawbacks. The mold surface tends to impress any irregularities into the glass surface to a greater extent when both major surfaces are engaged during press bending. This causes optical defects in the vision portion of the finished product that is shaped by press bending using solid type molds. Using frame molds instead of solid type molds avoids optical defects due to mold contact in the vision portion, but fails to control the shape of the intermediate region of the glass any better than gravity sag bending using an outline type mold. When a hot glass sheet is press bent between a solid-type press bending mold and a frame-type press bending mold, there is less marring of the viewing portion of the bent glass sheet than when the glass is pressed between two solid-type molds. However the opposite surfaces of the glass sheet cool to different temperatures above the strain point during shaping. Then, the bent glass sheet warps thermally when it cools to a symmetrical temperature gradient below the strain point of the glass. In the past, attempts were made to compensate for this warpage by press bending the glass to a shape different from the ultimate shape. However, this technique met with limited success because of the difficulty in maintaining uniform the many parameters such as heating pattern in the furnace, mold temperatures, uniformity of glass thickness, etc., that determined the amount of compensation needed for each bent glass sheet pattern.

SUMMARY OF THE PRESENT INVENTION

The present invention suggests a novel combination of glass sheet treatment steps. First, it press bends glass sheets between a solid-type mold and a frame-type mold, thereby reducing optical marking in the viewing area to some extent. In addition, the present invention uses contoured glass engaging means, in the form of a tempering ring or a series of discontinuous ring portions, during the cooling step to engage at least a portion of the major surface of the glass sheet engaged by the solid-type press bending mold during the shaping, while the opposite major glass sheet surface is not engaged. In addition, chilling medium used to cool the glass to below its deformation temperature is applied at different rates against the opposite surfaces of the bent glass sheet. This differential application of chilling medium forces the glass against the glass edge portion engaging means to help conform the glass shape to the contour of the glass edge portion engaging means. At the same time, the differential application of chilling medium against the opposite major surfaces of the glass sheet reduces the temperature difference established between the major surfaces of the glass sheet during press bending, thereby reducing and virtually eliminating the thermal warpage of the bent glass after the glass is cooled to temperatures below the strain point. The present invention avoids the prior art need to adjust the shapes of the press bending molds to compensate for thermal warpage of the glass, an adjustment that is difficult to control.

The manner by which the present invention accomplishes its desired results of providing mass production of press bent and cooled glass articles will be better understood from a detailed description of a preferred embodiment and modifications thereof that follows.

BRIEF DESCRIPTION OF THE DRAWINGS

In the drawings that form part of the description of a preferred embodiment and wherein like reference numbers refer to like structural elements.

FIG. 2 is a fragmentary plan view of a press bending station forming part of the apparatus of FIG. 1;

FIG. 3 is a fragmentary end view of the press bending station of FIG. 2;

FIG. 4 is a perspective view of a cooling station forming part of the apparatus of FIG. 1 with certain parts omitted to show other parts clearly;

FIG. 5 is a top plan view, partly in horizontal section, of the cooling station of FIG. 4 with certain parts omitted to show other parts clearly;

FIG. 6 is a detailed end view of a frame-type press bending mold from the press bending station with part of its cover removed to show other structural elements; and FIG. 7 is a cross-sectional view taken along the lines VII — VII of FIG. 2.

DESCRIPTION OF THE PREFERRED EMBODIMENTS

Figure 1:
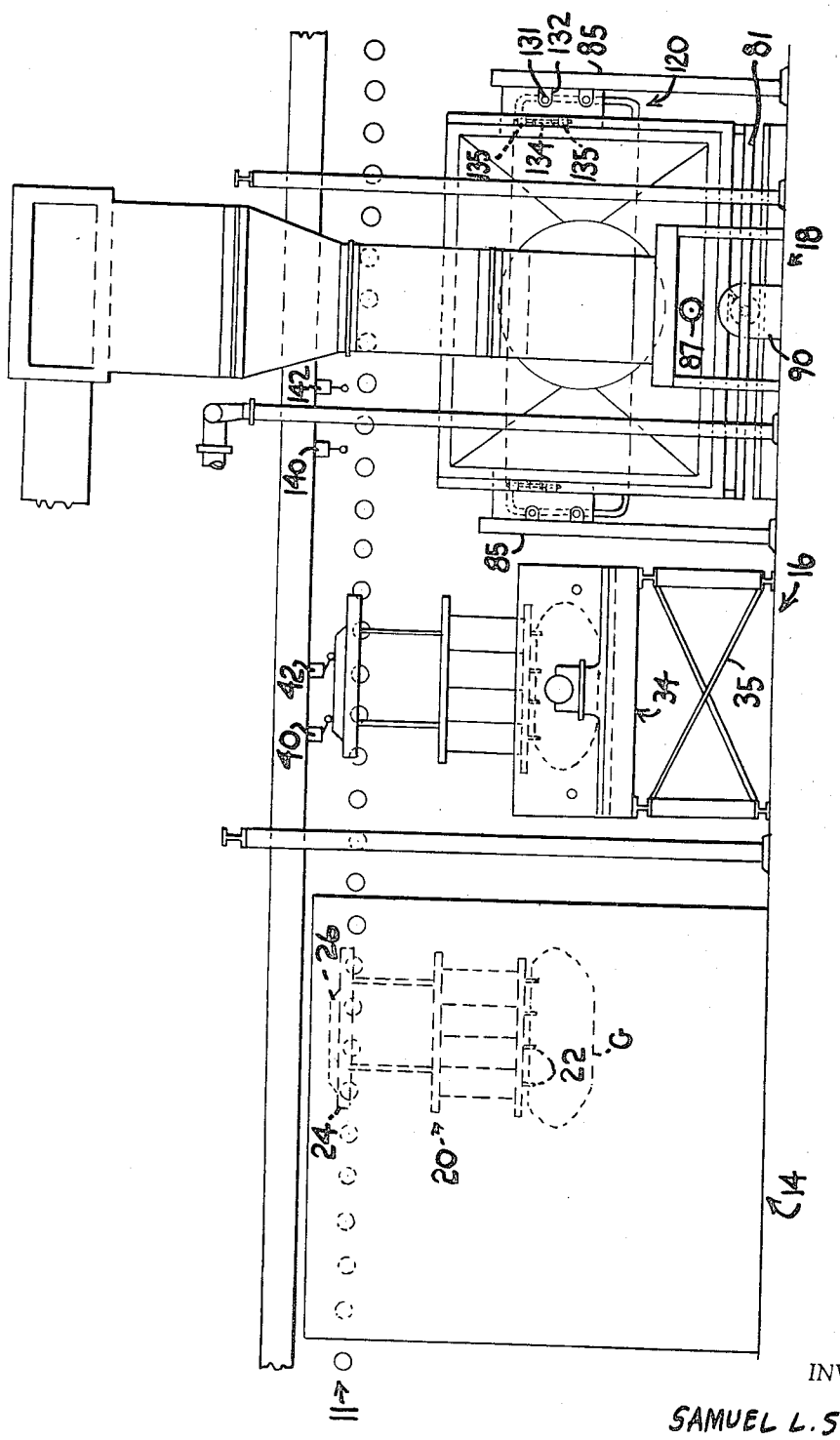
FIG. 1 is a longitudinal assembly view of a preferred embodiment of apparatus for performing the present invention, part of which is fragmentary to show certain elements clearly.

Referring particularly to FIG. 1, a conveyor 11 is shown extending in a horizontal direction through a tunnel-like furnace 14, a press bending station 16 and a cooling station 18. The conveyor 11 is conventional for this type of apparatus and comprises a series of rolls arranged in end-to-end sections, each section being selectively driven by a clutch (not shown). The rolls are mounted on a conventional support means for rotation. The rotating rolls support a series of carriages 20 for controlled movement in a manner well known in the art to cause the glass sheets to move along a given horizontal path while the sheets are suspended in a vertical plane.

Each carriage 20 is provided with a number of tongs 22 of the self-closing type, preferably of the type described in U.S. Pat. No. 3,089,727 to William J. Hay, that grip a glass sheet G to be treated, the number and arrangement of the tongs being determined by the size and shape of glass sheet undergoing treatment. The carriage has an upper rail 24 that rides on the conveyor rolls. A cam 26 is mounted on the upper rail 24 to engage and disengage limit switches whose operation will be described later.

The furnace 14 is provided with heating elements arranged along its opposite walls to heat a succession of glass sheets G conveyed through the furnace. The amount of heating provided through the heating elements is correlated with the time it takes for a glass sheet to traverse the furnace 14 so that the glass sheet G is at least at its deformation temperature when it arrives at the press bending station 16. The furnace includes a limit switch that controls a timer circuit (not shown) that controls the opening of an exit door to the furnace and the operation of a high speed conveyor section that transfers the carriage that happens to be the leading carriage 20 of a series of carriages in the furnace at the time to a desired position at the press bending station 16, as is conventional.

The press bending station 16 comprises a pair of press bending molds including a frame-type female mold 31 shown to the left of FIGS. 2 and 3 and a solid-type male mold 32 shown to the right of these drawings. The molds are shown in their retracted position on either side of the given path traversed by the glass sheet G along conveyor 11. Piston assemblies 33 and 34 are attached to the rear of the frame-type mold 31 and the solid-type mold 32, respectively, to move the molds between the depicted retracted position and a glass engaging position. Support frames 35 are provided for each of the piston assemblies.

A limit switch 40 is provided at the press bending station 16 for engagement by the cam 26 on each carriage 20 to actuate a timer circuit (not shown) that causes the piston assemblies 33 and 34 to move molds 31 and 32 toward the opposite surfaces of a glass sheet, hold the molds in engagement for a desirable time and then retract.

Meanwhile, another limit switch 42 beyond limit switch 40 is engaged by cam 26 to actuate a timer circuit (not shown) that controls the stopping of the conveyor section that transfers a carriage 20 from the furnace 14 to the press bending station 16 to control the position at which the carriage 20 stops so that the glass sheet G is aligned in a proper position between the molds 31 and 32. The timer circuit disengages a control clutch (not shown) and actuates a brake (not shown) to keep the transfer conveyor section stopped until the molds 31 and 32 engage the glass sheet G. Then the timer releases the brake to clear the conveyor 11 for moving the carriage 20 from the press bending station 16 to the cooling station 18 when it reactivates the clutch. The details of the conveyor system and its limit switch controls are well known in the art and form only part of the environment for the present invention, not of the invention per se.

The solid-type male mold 32 is preferably of the type covered by U.S. Pat. No. 3,367,764 to Samuel L. Seymour and comprises a relatively flexible shaping plate 50 about ¼ inch thick of hot rolled steel having an outer shaping face 51 of convex contour, a relatively rigid plate 52 thicker and slightly larger than shaping plate 50 (composed of ½ inch thick cold rolled No. 1018 carbon steel) behind the latter, with a series of connecting elements 53 adjustable in length connecting spaced points along the rear surface of the shaping plate 50 to corresponding shaped points along the front of the rigid plate 52 so that adjusting the length of each connecting element 53 changes the configuration of the shaping face 51 in the vicinity of the adjusted connecting element.

The shaping plate 50 has a series of notches 54 along its upper edge to provide clearance for the glass gripping tongs 22 during press bending. The rigid plate 52 is securely connected in spaced relation to a piston plate 55 through externally threaded bolts 56 and lock nuts. The piston plate 55 moves with the ram of the piston assembly 34 in a manner well known in the art.

In order to protect the hot glass sheet G from direct contact with the metal of the shaping plate 50, a cover of knit fiber glass cloth 57 is provided in direct contact over the shaping face 51. A series of closely spaced clamps 58 are mounted around the periphery of either the rigid plate 52 or the piston plate 55, whichever is more convenient, to clamp the cover 57 in position where it is in unwrinkled condition over the shaping surface 51 that it covers. The cover is preferably formed by knitting textured fiber glass yarn as disclosed in U.S. Pat. No. 3,148,968 to James H. Cypher and Clement E. Valchar.

The frame-type press bending mold 31 is similar in construction to the solid-type pressing mold 32 in that it has a rigid plate 62 attached rigidly to a piston plate 65, which plates have constructions similar to those provided for the plates 52 and 55 associated with the solid-type press bending mold 32. In the case of the frame-type press bending mold, its piston plate 65 is attached to the front end of the ram for the piston assembly 33.

The pressure applying element of the frame-type press bending mold 31 is a frame 60 having an outline shaping surface 61 complementary to the shape of the shaping surface 51 of the solid-type press bending mold 32. The frame 60 is shown in FIG. 7 in cross-section having a head portion 63 of hot rolled steel 1¼ inch wide and 3/16 inch thick and a stem portion 64 1 1/16 inch long and 3/16 inch thick. The stem portion is connected at spaced portions along its length to a series of adjustable connectors 66 interconnecting the stem portion 64 of the shaping frame 60 with the rigid plate 62 so that when adjustable connectors 66 have their length adjusted, each one modifies the curvature of the frame in the vicinity of its connection to the stem portion 64.

Notches 67 are provided along the length of the upper horizontal run of the head portion 63 of the shaping frame 60. Notches 67 are aligned with the notches 54 to provide clearance for the tongs 22 when the molds 31 and 32 engage a heat softened glass sheet to shape the latter.

Initially, the hot glass sheets G coming from the furnace 14 into the press bending station 16 must be protected against contact with the relatively cold metal of the shaped frame 60. Consequently, a fiber glass cover 70 extends completely across the opening enclosed by frame 60 and around the margin of the frame 60 and has a series of clamps 72 securing the end portion of the fiber glass cover 70 to the nearest connectors 66.

The cover 70 for the frame-type female mold 31 is preferably of the same material as the cover 57 which covers the solid-type male mold 32.

Under ordinary circumstances, a fiber glass cover for a female press bending mold tends to wear, particularly in case the frame-type mold defines a non-uniform curvature including one or more regions of relatively sharp curvature. However, it has been found unnecessary to replace a worn fiber glass cover for a frame-type press bending mold when a mass productive operation continues without interruption under certain circumstances. These circumstances require that the head portion 63 attain a temperature at least equal to the strain point of the glass as of the time the cover for the press bending mold is worn out. This objective can be accomplished by using two layers of knit fiber glass cloth having the following specifications:

28 gauge (18⅔ needles per inch)
26 stitch or courses per inch
made of fiber glass yarn 150–1/0–1.0 Z DE
about 10 percent textured.

Before the time the frame reaches the strain point of the glass, the fiber glass cover provides suitable insulation to protect the hot glass from direct contact with the frame at a temperature below the strain point of the glass. However, as soon as the frame reaches a temperature at least equal to the strain point of the glass, the danger of chill cracking resulting from direct contact is reduced.

Knit fiber glass cloth covers for male press bending molds do not become worn as rapidly as those used to cover female press bending molds. Furthermore, the solid shaping plate 50 which forms the shaping face 51 of the solid-type male mold 32 does not increase in temperature as rapidly as the less massive shaping frame 60 which forms the pressing face 61 of the female pressing mold 31. Hence, the ability of the knit fiber glass cover 57 to insulate the glass from direct contact with the shaping plate 50 remains in effect after the requirement for such thermal insulation is no longer necessary in the case of the female frame press bending mold 31.

The cooling station 18 (FIGS. 1, 4 and 5) comprises a pair of plenum chambers 76 and 78, which are connected to a source of air under pressure through flexible couplings 79. Suitable valve means (not shown) are provided in the air supply systems to control the pressure supply to the plenum chambers 76 and 78. The plenum chambers are supported by a frame having front and rear cross beams 80 and longitudinal connecting beams 81. The beams 80 and 81 are below the cooling station 18. Vertical posts 82 for each plenum chamber are connected to the frame beams and rise upwardly therefrom and are connected at their upper ends to their respective plenum chambers 76 or 78. The vertical posts 82 are slidably supported in sleeves 83 and are loaded by springs 84 to control vertical reciprocation of the plenum chambers 76 and 78. A rigid support frame 85 supports the vertical sleeves 83. Pistons 86 and 87 are mounted to the rear of plenum chambers 76 and 78, respectively, on platforms carried by said beam frame.

A motor 90 acting through a drive shaft 92 and eccentric cams 94 support each connecting beam 81 for vertical movement so as to cause the plenum chambers 76 and 78 to reciprocate vertically as the spring loaded vertical posts 82 reciprocate in sleeves 83.

Each plenum chamber is bi-furcated to provide upper and lower air passages 95 and 96, respectively, for plenum chambers 76 and additional upper and lower passages 97 and 98, respectively, for plenum chamber 78. Each of these passages terminate in an apertured end wall 100 that faces the path of travel taken by the glass sheets G as defined by the conveyor 11. The apertures in the respective end walls 100 are vertically aligned between the upper and lower air passages for each plenum chamber and horizontally aligned from plenum chamber to plenum chamber. A collar 102 extends outward from each aperture in the apertured end walls. Each collar receives a horizontal portion 104 of an elbow 106. Each elbow 106 includes a vertical portion 108. The vertical portion 108 of each elbow 106 associated with the apertures in the walls terminating the upper air passages 95 and 97 extend vertically downward, while the vertical portions 108 of the elbows 106 associated with the apertures in the walls terminating the lower air passages 96 and 98 extend vertically upward. The position of the horizontal portion 104 of each elbow 106 is adjustable axially to its associated collar 102.

A clamp 110, similar to that used in automobile radiator hoses, is provided to fix the relative position of each horizontal portion 104 of each elbow with respect to its associated collar 102. The vertical portions 108 of each pair of elbows 106 in vertical alignment with each other for each of the plenum chambers 76 or 78 are interconnected by an apertured nozzle box 112 of rectangular cross section through substantially its entire extent and terminating in rounded end portions 114 of circular cross section that are adapted for connection with the adjacent vertical portion 108. In this manner, the apertured nozzle boxes 112 interconnect the vertically aligned vertical portions 108 of corresponding elbows 106. Each apertured nozzle box 112 has an apertured vertical wall 116, the apertures 118 of which are aligned in obliquely extending rows and cross rows. Each apertured nozzle box 112 is capable of being pivoted about a vertical axis and clamped in any desired orientation, preferably to face a portion of a curved glass sheet G, so that air blasted into the respective plenum chambers is discharged through the apertures 118 in a direction approximately normal to the surface of the glass sheet G supported between the plenum chambers for cooling.

The motor 90 through drive shaft 92 and eccentric cams 94 causes the plenum chambers 76 and 78 together with their associated nozzle boxes 112 to reciprocate vertically while air under pressure is discharged against the opposite surfaces of glass sheet suspended by tongs. The position of each nozzle box 112 may be adjusted by horizontal adjustment of its attached upper and lower elbows 106 by moving the horizontal elbow portions 104 until they reach such positions that in plan view such as FIG. 5, the nozzle boxes 112 provide parallel shapes conforming to the shape of the bent glass sheet to be cooled. The blast emanating from each aperture 118 of the apertured vertical walls 116 of the nozzle boxes 112 defines a vertical elongated area of cooling. Each of these areas overlaps the areas of cooling provided by air blasts from adjacent nozzles. This overlapping is both horizontal and vertical.

The cooling apparatus also comprises a tempering ring 120 of outline configuration to engage the marginal portion of one of the glass sheet surfaces. To accomplish this end, the ring 120 is disposed in front of plenum chamber 78 and between plenum chamber 78 and the path of glass sheet travel defined by the conveyor 11. While a continuous ring is depicted, it is understood that a series of spaced ring sections may be substituted depending on the severity of curvature of the glass sheet treated.

The tempering ring 120 comprises a rail 122 disposed with a serrated edge 124 at the edge surface facing the path or course travelled by the glass sheets. The edge surface that is serrated has a shape conforming to the shape and outline of a press bent sheet, except that the edge surface 124 of the continuous rail 122 defines a shape spaced slightly inward (about five-sixteenths inch) from the entire perimeter of the treated glass sheet. Rail 122 also has apertures 125 of a size and shape sufficient to permit tempering medium to escape after it chills the glass sheet G. Thin wire or flexible ribbon can be looped between the apertures 125 and the edge surface 124 to further enhance the flow of tempering medium from the glass surface.

The tempering ring 120 also includes means to provide structural rigidity for the rail 122. This latter means comprises an outrigger support pipe 126 and suitable connecting rods 128 that interconnect the reinforcing outrigger pipe 126 with the outer surface of rail 122 in a position spaced from the serrated edge 124 of the latter. The pipe 126 is rigidly secured to a frame member 130 and the frame member includes rearwardly extending horizontal guide rods 131 slidable in sleeves 132. The latter are securely fastened to support frame 85.

Apertured brackets 133 are secured to the frame member 130 to receive vertical guide rods 134. The latter interconnect vertically spaced ears 135 attached to a vertically extending angle member 136 rigidly attached to each side of each plenum chamber 76 and 78 (although only the attachment to plenum chamber 78 is shown). Pistons 86 and 87 operate in unison to move the plenum chambers 76 and 78 in and out in unison with the tempering ring 120, yet the structure allows vertical reciprocation of the plenum chambers relative to the tempering ring.

Referring now to FIG. 1 again, a pair of limit switches 140 and 142 is provided at the cooling station 18. Limit switch 140 is positioned for actuation by the cam 26 at the upper rail 24 of a carriage to actuate a timer that controls the blowing of air under pressure into the plenum chamber and the movement of the plenum chambers 76 and 78 and the tempering ring 120 into a position wherein the ring 120 engages a glass sheet and supports the latter for a preset time until the plenum chambers and tempering ring are retracted to provide clearance for the cooled glass sheet to leave the cooling station and another sheet to enter. Limit switch 142 also disposed along the path of movement of cam 26, actuates another timer that actuates another stop mechanism similar to the one provided at the press bending station 16 to insure that the carriage stops at a proper position so that the glass sheet G is aligned with the tempering ring 120.

Provision is made to blast the air into plenum chamber 76 at a slightly higher pressure than the pressure applied to the air supply to plenum chamber 78. This pressure differential forces the bent glass sheet G to be blown against the tempering ring 120 in the initial stage of the cooling operation before the glass sheet becomes set so that the marginal portion of the glass which contacts the serrated edge surface 124 of the tempering ring rail 122 conforms to the desired shape.

In addition, this differential pressure causes a greater flow of chilling medium against the convex surface of the glass which was in pressurized engagement with the frame-type female mold 31 about its marginal portion only and lesser flow of chilling medium against the concave surface of the glass sheet which was in pressurized engagement with the solid-type mold 32 through substantially its entire extent. Therefore, the glass sheet G, which had a surface temperature differential imposed from surface to surface during the press bending step, has this temperature differential reduced, if not completely eliminated, during the cooling operation.

In a typical operation given by way of example to describe working embodiments of the present invention, glass sheets gripped along their upper edge portion by tongs were passed through a furnace to reach a surface temperature of about 1,220° to 1,230° Fahrenheit. Each glass sheet was removed from the furnace on obtaining a temperature in the desired temperature range and was transferred to the press bending station 16 in about 4¾ seconds. When the glass reached the press bending station, it took about 2 seconds for the press bending molds 31 and 32 to engage the glass sheet for pressurized engagement. The shaping members were held in pressurized engagement against the glass sheet for about 4 seconds. The glass sheet remained at the shaping station while the pressing molds were retracted from one another and then moved into the cooling station 18, taking an additional time of about 4 seconds for this latter operation.

At the cooling station the following parameters were used: for glass having a nominal thickness of one quarter inch, the apertured vertical walls 116 of the opposed plenum chambers were spaced 7 inches apart and pressures of 8 ounces per square inch and 5 ounces per square inch applied to the opposite glass surfaces;

for 3/16 inch nominal thickness glass, the spacing between opposite plenum chambers was reduced to 6 inches and the pressure increased to 11 ounces per square inch and 8 ounces per square inch against the respective surfaces; for glass having a nominal thickness of five thirty-seconds inch, the spacing between opposed plenum chambers was only 5 inches and opposing pressures were 18 ounces per square inch and 15 ounces per square inch, respectively.

Without the tempering ring, the glass sheets were bent to configurations outside the tolerances permitted by the customer, necessitating adjusting the shape of the press bending molds to compensate for the distortion on cooling. Such adjustments failed to provide results that were consistent. The incorporation of a tempering ring, and, in instances of patterns requiring less severe curvature, upper and lower rails only or side rails only shaped to the portion of the outline configuration they represented, improved the compliance of the bent glass sheets to desired tolerances.

The form of the invention shown and described in this disclosure represents an illustrative preferred embodiment thereof. It is understood that various changes may be made without departing from the spirit of the invention as defined in the claimed subject matter that follows.

I claim:

1. A method of treating glass sheets comprising heating a glass sheet to at least its deformation temperature in an enclosed, hot atmosphere, shaping said glass sheet outside said enclosed, hot atmosphere while still at its deformation temperature by engaging one of its surfaces in pressurized engagement throughout substantially its entire extent with a solid-type press bending mold having a relatively large heat capacity and with its other surface in pressurized engagement at its marginal portion only with a frame-type press bending mold having a relatively small heat capacity while said molds are cooler than said glass sheet, whereby the bent glass sheet develops a thermal gradient throughout its thickness as a result of its opposite surfaces having different amounts of heat exchange with said opposite molds, which thermal gradient would remain sufficiently large as the glass cools normally to below its strain point to cause thermal warpage, and cooling said bent glass sheet to below its deformation temperature by applying chilling medium against said glass sheet surface characterized by engaging the marginal portion of only said surface previously engaged by said solid-type press bending mold at sufficient points to define the final curvature and applying said chilling medium with less force against said surface whose marginal portion is engaged at said points while applying a greater force of chilling medium against the opposite surface of said glass sheet during said cooling, said difference in application of chilling medium being sufficient to force said marginal portion into pressurized engagement against said points and to reduce said thermal warpage.

2. The method as in claim 1, wherein said bent glass sheet is engaged by an outline shaping surface having a shape approximately the ultimate shape desired for the treated glass sheet during the application of said chilling medium with said force differential.

3. The method as in claim 1, including conveying said glass sheet from a first position between said press bending molds to a second position where said chilling medium is applied differentially to said opposite surfaces immediately after said shaping.

4. Apparatus for treating glass sheets comprising an enclosed heating furnace, a press bending station and a cooling station disposed in end to end relation, and a conveyor having operatively connected thereto means for engaging a glass sheet, said conveyor extending through said furnace, said press bending station and said cooling station to provide a given path for glass sheets to be treated,
a pair of pressing molds at said press bending station comprising a solid-type mold having a relatively large heat capacity and a frame-type mold having a relatively small heat capacity,
means to move at least one of said molds between a retracted position wherein said molds are spaced from one another on opposite sides of said path, and a glass sheet engaging position wherein a hot glass sheet develops a thermal gradient through its thickness by virtue of being engaged between said molds for sufficient time to impose a shape in said engaged hot glass sheet, said thermal gradient being of sufficient magnitude to cause the glass sheet shaped in said glass engaging position to develop thermal warpage when said sheet is cooled normally,
means located only at said cooling station on the side of said path occupied by said solid-type mold mounted to engage the outline of said glass sheet at sufficient points to define the final curvature, said means conforming to the ultimate shape desired for said glass sheet,
plenum chambers disposed at said cooling station on opposite sides of said given path,
said glass outline portion engaging means being disposed between said given path and one of said plenum chambers,
and means for imparting chilling medium through said plenum chambers at rates rapid enough to impart at least a partial temper to the shaped glass and at rates sufficiently different against the opposite sides of said glass sheet to force said outline portion of said glass sheet into pressurized engagement against said outline engaging means and to reduce said warpage.

5. Apparatus as in claim 4, wherein said glass outline engaging means is rigidly supported and said plenum chambers have nozzle openings through which said chilling medium is applied under pressure, further including means to move said nozzle openings in unison relative to said glass outline portion engaging means while applying chilling medium against the opposite surfaces of said glass sheet.

6. Apparatus as in claim 4, wherein each of said pressing molds is provided with a cover of knit fiber glass cloth positioned to contact a major surface of said glass sheet when said molds occupy said glass engaging position.

7. Apparatus for treating glass sheets as in claim 6, said frame-type press bending mold having a contour that conforms approximately to the shape and outline desired for a glass sheet to be shaped and enclosing an open shaping face, a knit fiber glass cloth cover extending across the opening enclosed by said frame-type bending mold and means to secure said cover in tension to said frame-type mold so that said cover extends across said open face.

8. Apparatus as in claim 4, wherein said means for engaging said glass sheet during its transport along said conveyor comprises self-closing tongs that suspend said glass sheet in a vertical plane, whereby said glass sheet is susceptible to swaying at said cooling station, and means is provided for applying chilling medium at a lesser pressure through said nozzle openings of said plenum chamber disposed on the side of said given path occupied by said glass outline portion engaging means and at a greater pressure through said nozzle openings of said plenum chamber disposed on the other side of said given path.

9. Apparatus as in claim 4, wherein said means at said cooling station comprises a ring having an outline configuration conforming in shape to that desired for said glass sheets after said treating.

10. Apparatus as in claim 9, wherein said ring has a serrated edge surface for engaging a press bent glass sheet at said cooling station.

11. Apparatus as in claim 9, wherein said ring comprises a continuous apertured rail defining a shape conforming in curvature and outline to that of the treated glass sheet and slightly inward of the entire perimeter thereof.

* * * * *